United States Patent
Drummond et al.

(10) Patent No.: US 11,757,852 B2
(45) Date of Patent: Sep. 12, 2023

(54) ENCRYPTION KEY MANAGEMENT FOR INTERNATIONAL DATA RESIDENCY

(71) Applicant: Salesforce, Inc., San Francisco, CA (US)

(72) Inventors: Audrei Drummond, Oakland, CA (US); Richard Crowley, San Francisco, CA (US); James Scheinblum, Oakland, CA (US); Eden Ghirmai, Oakland, CA (US); Lydia Gorham, Oakland, CA (US); Pooja Mehta, San Francisco, CA (US); Raissa Largman, San Francisco, CA (US); Karen Nguyen, San Francisco, CA (US); Ratnadeep Bhattacharjee, Palo Alto, CA (US); Stephen Hamrick, Redwood City, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/981,169

(22) Filed: Nov. 4, 2022

(65) Prior Publication Data
US 2023/0053443 A1    Feb. 23, 2023

Related U.S. Application Data

(63) Continuation of application No. 16/918,284, filed on Jul. 1, 2020, now Pat. No. 11,539,675, which is a
(Continued)

(51) Int. Cl.
*H04L 9/40* (2022.01)
*H04L 9/08* (2006.01)

(52) U.S. Cl.
CPC ........ *H04L 63/0428* (2013.01); *H04L 9/0822* (2013.01)

(58) Field of Classification Search
CPC ... H04L 63/0428; H04L 9/0822; H04L 9/088; H04L 9/14; H04L 63/062; H04L 9/0836
See application file for complete search history.

(56) References Cited

U.S. PATENT DOCUMENTS 5,944,838 A    8/1999 Jantz
6,718,361 B1   4/2004 Basani et al.
(Continued)

FOREIGN PATENT DOCUMENTS

CA    3093718 A1    12/2019
EP    3667514 A1    6/2020
(Continued)

OTHER PUBLICATIONS

Extended European Search Report dated Feb. 17, 2023 for European Patent Application No. 22193799.8, 9 pages.
(Continued)

*Primary Examiner* — Beemnet W Dada
(74) *Attorney, Agent, or Firm* — Lee & Hayes, P.C.

(57) ABSTRACT

Media, method, and system for providing encryption key management for international data residency. Organizations using a group-based communication system can designate a particular geopolitical area where that organization's data can be stored and another geopolitical area (which may be the same or different) where encryption keys used to encrypt and decrypt that data should be stored. Users of that organization can post message or access messages previously posted on the group-based communication system from any geopolitical area, causing the system to automatically store and retrieve messages and encryption keys from the appropriate regions to allow the users to transparently access the group-based communication system while maintaining security and data residency requirements.

20 Claims, 7 Drawing Sheets

US 11,757,852 B2
Page 2

Related U.S. Application Data continuation-in-part of application No. 16/702,197, filed on Dec. 3, 2019, and a continuation-in-part of application No. 16/434,097, filed on Jun. 6, 2019, now Pat. No. 10,778,419.

(60) Provisional application No. 62/900,297, filed on Sep. 13, 2019, provisional application No. 62/895,333, filed on Sep. 3, 2019, provisional application No. 62/780,067, filed on Dec. 14, 2018, provisional application No. 62/681,578, filed on Jun. 6, 2018.

(56) References Cited

U.S. PATENT DOCUMENTS

| | | | |
|---|---|---|---|
| 7,546,459 B2* | 6/2009 | Robles | H04L 9/321 713/168 |
| 7,546,465 B2 | 6/2009 | Kent, Jr. et al. | |
| 8,416,954 B1 | 4/2013 | Raizen | |
| 8,738,905 B2 | 5/2014 | Ferris et al. | |
| 9,100,355 B2 | 8/2015 | Tomkow | |
| 9,380,523 B1 | 6/2016 | Mijar | |
| 9,514,324 B1 | 12/2016 | Potlapally et al. | |
| 9,846,540 B1 | 12/2017 | Franklin et al. | |
| 9,940,394 B1 | 4/2018 | Grant et al. | |
| 10,223,543 B1 | 3/2019 | Mohen et al. | |
| 10,372,926 B1* | 8/2019 | Leshinsky | H04L 9/083 |
| 10,721,166 B2 | 7/2020 | Barnes et al. | |
| 10,778,419 B2 | 9/2020 | Crowley et al. | |
| 10,885,009 B1 | 1/2021 | Anghel | |
| 11,150,934 B2 | 10/2021 | Beaty et al. | |
| 11,395,211 B2 | 7/2022 | Szrom et al. | |
| 2005/0198170 A1 | 9/2005 | LeMay et al. | |
| 2009/0234845 A1* | 9/2009 | DeSantis | H04L 63/308 707/999.005 |
| 2010/0114949 A1 | 5/2010 | Sakamoto | |
| 2013/0036100 A1 | 2/2013 | Nagpal et al. | |
| 2014/0114972 A1 | 4/2014 | Ducott, III et al. | |
| 2014/0148162 A1* | 5/2014 | Maharaj | H04W 64/003 455/435.2 |
| 2014/0344571 A1* | 11/2014 | Adam | G06F 21/6218 713/165 |
| 2014/0351606 A1 | 11/2014 | Demilo et al. | |
| 2015/0169624 A1 | 6/2015 | Gupta et al. | |
| 2015/0365361 A1 | 12/2015 | Tomlinson et al. | |
| 2016/0050177 A1 | 2/2016 | Cue et al. | |
| 2016/0142350 A1 | 5/2016 | Mutha | |
| 2016/0173623 A1 | 6/2016 | Broussard | |
| 2016/0275303 A1 | 9/2016 | Narayanaswamy et al. | |
| 2016/0277498 A1 | 9/2016 | Kulkarni et al. | |
| 2016/0359684 A1 | 12/2016 | Rizqi et al. | |
| 2017/0063797 A1 | 3/2017 | Jain | |
| 2017/0091055 A1 | 3/2017 | Rangaswami et al. | |
| 2017/0371789 A1 | 12/2017 | Blaner et al. | |
| 2018/0048464 A1 | 2/2018 | Lim et al. | |
| 2018/0089258 A1 | 3/2018 | Bhattacharjee et al. | |
| 2018/0124597 A1* | 5/2018 | Malthankar | H04L 9/3249 |
| 2018/0197144 A1 | 7/2018 | Frank et al. | |
| 2018/0287982 A1 | 10/2018 | Draeger et al. | |
| 2019/0074967 A1 | 3/2019 | Stuntebeck et al. | |
| 2019/0213255 A1 | 7/2019 | Benantar | |
| 2019/0278661 A1 | 9/2019 | Mehta et al. | |
| 2019/0379534 A1 | 12/2019 | Crowley | |
| 2019/0386683 A1 | 12/2019 | Danilov et al. | |
| 2019/0386945 A1 | 12/2019 | Wills et al. | |
| 2020/0007529 A1 | 1/2020 | Bahrenburg et al. | |
| 2020/0076811 A1 | 3/2020 | Rudden et al. | |
| 2020/0192881 A1 | 6/2020 | Largman et al. | |
| 2020/0314173 A1 | 10/2020 | Pahwa et al. | |
| 2020/0374111 A1 | 11/2020 | Crowley et al. | |
| 2020/0412806 A1 | 12/2020 | Largman et al. | |
| 2021/0091933 A1 | 3/2021 | Crowley et al. | |

FOREIGN PATENT DOCUMENTS

| | | |
|---|---|---|
| EP | 3777015 A1 | 4/2022 |
| JP | 2007193168 A | 8/2007 |
| JP | 2015049542 | 8/2013 |
| JP | 2014515524 A | 6/2014 |
| WO | WO2014204862 A1 | 12/2014 |
| WO | WO2017040334 A1 | 3/2017 |
| WO | WO2019236905 A1 | 12/2019 |

OTHER PUBLICATIONS

Office Action for Australian Patent Application 2020104253, dated Oct. 6, 2021, 4 pages.

Australian Office Action dated Apr. 11, 2022 for Australian Patent Application No. 2021107603, a foreign counterpart to U.S. Appl. No. 16/918,284, 3 pages.

Australian Office Action dated May 6, 2021 for Australian Application No. 2020104253, a foreign counterpart to U.S. Appl. No. 16/918,284, 6 pages.

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

Canadian Office Action dated Oct. 7, 2021 for Canadian Patent Application No. 3092836, a foreign counterpart to U.S. Appl. No. 16/918,284, 3 pages.

Canadian Office Action dated Jul. 9, 2021 for Canadian Patent Application No. 3063660, a foreign counterpart to U.S. Appl. No. 16/702,197, 7 pages.

Canadian Office Action dated Aug. 30, 2022 for Canadian Patent Application No. 3092836, a foriegn counterpart to U.S. Appl. No. 16/918,284, 4 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2 013, 1:15 PM) 3 pages.

European Application No. 19734545.7, Examination Report dated Apr. 7, 2021.

Extended European Search Report dated Mar. 19, 2020 for European Patent Application No. 19213366.8, 9 pages.

Extended European Search Report dated Jun. 24, 2021 for European Patent Application No. 21155087.6, 8 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019], Retrieved from the Internet: <URL: https://en.wikipedia.org/wiki/Internet_Relay_Chat>. (dated May 28, 2019) 21 pages.

WIPO Application No. PCT/US2019/035870, International Search Report and Written Opinion of the International Searching Authority, dated Sep. 20, 2019.

Mike Issac, "Slack, a Start-Up With an App to Foster Business Collaboration, Is Valued at $1.1 Billion", The New York Times (56) References Cited

OTHER PUBLICATIONS

Blogs (Bits), Lexisnexis, https://advance.lexis.com/api/permalink/3eb84b34-a8f9-4d7d-9573-89d9598a4963/?context=1000516>. (dated Oct. 31, 2014) 3 pages.
Japanese Office Action dated Nov. 16, 2021 for Japanese Patent Application No. 2019-225306, a foreign counterpart to U.S. Appl. No. 16/702,197, 5 pages.
Japanese Office Action dated Dec. 14, 2021 for Japanese Patent Application No. 2020-170204, a foreign counterpart to U.S. Appl. No. 16/702,197, 6 pages.
Japanese Patent Application No. 2019-225306, Office Action with English translation, dated Mar. 23, 2021.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", Fujitsu Sci. Tech. J., 36, 2, (Dec. 2000) pp. 154-161.
Office Action for U.S. Appl. No. 16/702,197, dated Oct. 7, 2021, Largman, "Methods, Apparatuses, and Computer Program Products for Management of and Search Index Generation Based on Geographically Distributed Data", 21 Pages.
Office Action for U.S. Appl. No. 16/702,197, dated Oct. 17, 2022, Largman, "Methods, Apparatuses, and Computer Program Products for Management of and Search Index Generation Based on Geographically Distributed Data", 26 Pages.
Office Action fro U.S. Appl. No. 17/018,165, dated Feb. 16, 2022, Largman, "Methods, Apparatuses, and Computer Program Products for Management of Data Deletion Requests Based on Deographically Distributed Data", 15 Pages.
Office Action for U.S. Appl. No. 16/702,197, dated Apr. 13, 2022, Largman, "Methods, Apparatuses, and Computer Program Products for Management of and Search Index Generation Based on Geographically Distributed Data", 24 Pages.
Office Action for U.S. Appl. No. 17/018,165, dated Aug. 15, 2022, Largman, "Methods, Apparatuses, and Computer Program Products for Management of Data Deletion Requests Based on Geographically Distributed Data", 16 pages.
Oikarinen, J. & Reed, D., "Internet Relay Chat Protocol", Request for Comments: 1459, Network Working Group, [online][retrieved May 30, 2019], Retrieved from the Internet: <URL: https://www.rfc-editor.org/rfc/rfc1459.txt>. (dated May 1993) 57 pages.
Ernie Smith, "Picking Up The Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.
Japanese Office Action dated Jun. 6, 2023 for Japanese patent application No. 2022-043400, a foreign counterpart for U.S. Appl. No. 16/702,197, 5 pages.
Office Action for U.S. Appl. No. 17/018,165, dated Jun. 7, 2023, Inventor #1 Raissa Largman, "Methods, Apparatuses, and Computer Program Products for Management of Data Deletion Requests Based On Geographically Distributed Data," 15 pages.
Office Action for U.S. Appl. No. 16/702,197, dated Jun. 14, 2023, Largman, "Methods, Apparatuses, and Computer Program Products for Management of and Search Index Generation Based on Geographically Distributed Data", 28 Pages.

* cited by examiner

ENCRYPTION KEY MANAGEMENT FOR INTERNATIONAL DATA RESIDENCY

RELATED APPLICATIONS

This patent application claims priority to and is a continuation of U.S. patent application Ser. No. 16/918,284, which was filed on Jul. 1, 2020, which is a continuation-in-part application claiming priority benefit, with regard to all common subject matter, of earlier filed U.S. Non-Provisional Ser. No. 16/434,097, filed Jun. 6, 2019, and entitled "METHOD, APPARATUS, AND COMPUTER PROGRAM PRODUCT FOR ENCRYPTION KEY MANAGEMENT WITHIN A GROUP-BASED COMMUNICATION SYSTEM" ("the '097 Application"). The '097 Application is a non-provisional patent application claiming priority benefit, with regard to all common subject matter, of earlier-filed U.S. Provisional Patent Application No. 62/681,578, filed Jun. 6, 2018. The identified earlier-filed patent applications are hereby incorporated by reference in their entirety into the present application.

U.S. patent application Ser. No. 16/918,284 is a continuation-in-part application claiming priority benefit, with regard to all common subject matter, of earlier filed U.S. Non-Provisional patent application Ser. No. 16/702,197, filed Dec. 3, 2019, and entitled "METHODS, APPARATUSES, AND COMPUTER PROGRAM PRODUCTS FOR MANAGEMENT OF AND SEARCH INDEX GENERATION BASED ON GEOGRAPHICALLY DISTRIBUTED DATA" ("the '197 Application"). The '197 Application is a non-provisional patent application claiming priority benefit, with regard to all common subject matter, of earlier-filed U.S. Provisional Patent Application Nos. 62/895,333, filed, Sep. 3, 2019, and 62/780,067, filed Dec. 14, 2018. The identified earlier-filed patent applications are hereby incorporated by reference in their entirety into the present application.

U.S. patent application Ser. No. 16/918,284 is a non-provisional application claiming priority benefit, with regard to all common subject matter, of earlier-filed U.S. Provisional Patent Application No. 62/900,297, filed Sep. 13, 2019, and entitled "METHODS, APPARATUSES, AND COMPUTER PROGRAM PRODUCTS FOR MANAGEMENT OF DATA DELETION REQUESTS BASED ON GEOGRAPHICALLY DISTRIBUTED DATA." The identified earlier-filed provisional patent application is hereby incorporated by reference in its entirety into the present application.

TECHNICAL FIELD

Embodiments of the invention generally relate to the management of encryption keys for international data residency and, more particularly, to techniques for retrieving and storing encrypted message based on requirements for storing data and/or key material in particular geopolitical areas.

Traditionally, data for group-based communication systems is stored in a central location by the provider of the group-based communication system, without regard for the organization using the group-based communication system. However, some organizations desire to store their confidential data in particular geopolitical areas, to satisfy legal, regulatory, or political constraints. Simultaneously, some organizations desire to have their data stored in encrypted form to ensure privacy from potential intruders. However, the combination of managed encryption keys and geopolitical data storage constraints has previously required separate systems in each geopolitical area where data may be stored in order to maintain consistency and latency at acceptable levels. This results in inefficiencies and needlessly duplicated resources. As such, what is needed is a system allowing a customer-managed encryption keys and customer-specified data residency while allowing a central access point for coordination and interaction.

SUMMARY

Embodiments of the invention address the above-described need by providing for techniques allowing for the storage and retrieval of encrypted messages to arbitrary geopolitical areas using keys likewise managed in an arbitrary geopolitical area, all while allowing a central primary access point for the group-based communication system. In particular, in a first embodiment, the invention includes one or more non-transitory computer-readable media storing computer-executable instructions that, when executed by a processor, perform a method for providing encryption key management for international data residency, the method comprising the steps of receiving, from a user, a message to be posted in a channel-based communication system associated with an organization, the user being located in a first geopolitical area, responsive to determining, based on the organization, a second geopolitical area for residency of data associated with the organization, sending a request for an encryption key to a key server located in the second geopolitical area, wherein the second geopolitical area is different from the first geopolitical area, receiving, from the key server located in the second geopolitical area, an organization-specific encryption key, encrypting the message using the organization-specific encryption key, storing, in a second data store in the second geopolitical area, the encrypted message; and storing, in a first data store in the first geopolitical area, information identifying a storage location of the encrypted message without storing the encrypted message in the first geopolitical area.

In a second embodiment, the invention includes a method for providing encryption key management for international data residency, the method comprising the steps of receiving, from a client device, an indication of a user attempt to access an encrypted message posted in a group-based communication system associated with an organization, retrieving, from a first data store in a first geopolitical area, information identifying a storage location of the encrypted message, wherein the information identifying the storage location of the encrypted message indicates that the encrypted message is stored in a second data store in a second geopolitical area, wherein the second geopolitical area is distinct from the first geopolitical area, retrieving, from the second data store in the second geopolitical area, the encrypted message, responsive to determining that a decryption key associated with the encrypted message is not stored in a key cache in the first geopolitical area, retrieving the decryption key from a key server located in a third geopolitical area, wherein the third geopolitical area is distinct from the first geopolitical area, decrypting the encrypted message using the decryption key to obtain a plaintext message, transmitting, to the client device, the plaintext message for display to the user.

In a third embodiment, the invention includes one or more non-transitory computer-readable media storing computer-executable instructions that, when executed by a processor, perform a method for providing encryption key management for international data residency, the method comprising the steps of receiving, from a client device in a second geopolitical area, an indication of an attempt to access an encrypted message posted in a group-based communication system associated with an organization, retrieving, from a first data store in a first geopolitical area, information associated with the encrypted message, based on the information associated with the encrypted message, identifying the storage location of the encrypted message as a second data store in the second geopolitical area, wherein the second geopolitical area is distinct from the first geopolitical area, retrieving, from the second data store in the second geopolitical area, the encrypted message, retrieving an organization-specific decryption key associated with the encrypted message from a key server located in a third geopolitical area, wherein the third geopolitical area is distinct from the first geopolitical area, decrypting the encrypted message using the organization-specific decryption key to obtain a plaintext message, and transmitting, to the client device, the plaintext message for display to the user.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention provide for techniques allowing for the storage and retrieval of encrypted messages to arbitrary geopolitical areas using keys likewise managed in an arbitrary geopolitical area, all while allowing a central primary access point for the group-based communication system. In some embodiments, the group-based communication system is a channel-based messaging platform. These techniques, and exemplary environments for carrying them out, are described in greater detail below.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Figure 1A:
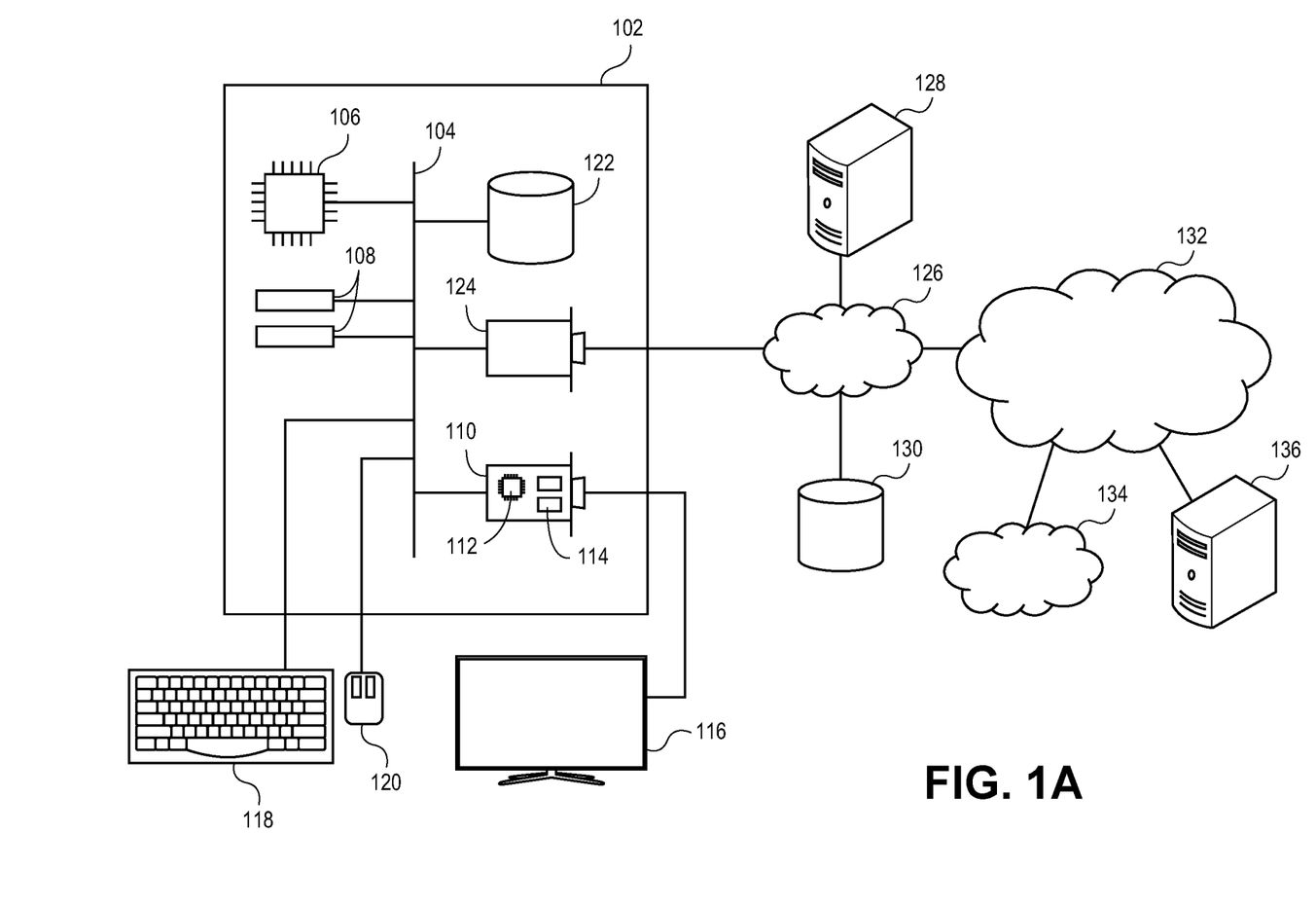
FIG. 1A depicts an exemplary hardware platform for certain embodiments of the invention.

Turning first to FIG. 1A, an exemplary hardware platform for certain embodiments of the invention is depicted. Computer 102 can be a desktop computer, a laptop computer, a server computer, a mobile device such as a smartphone or tablet, or any other form factor of general—or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 1B:
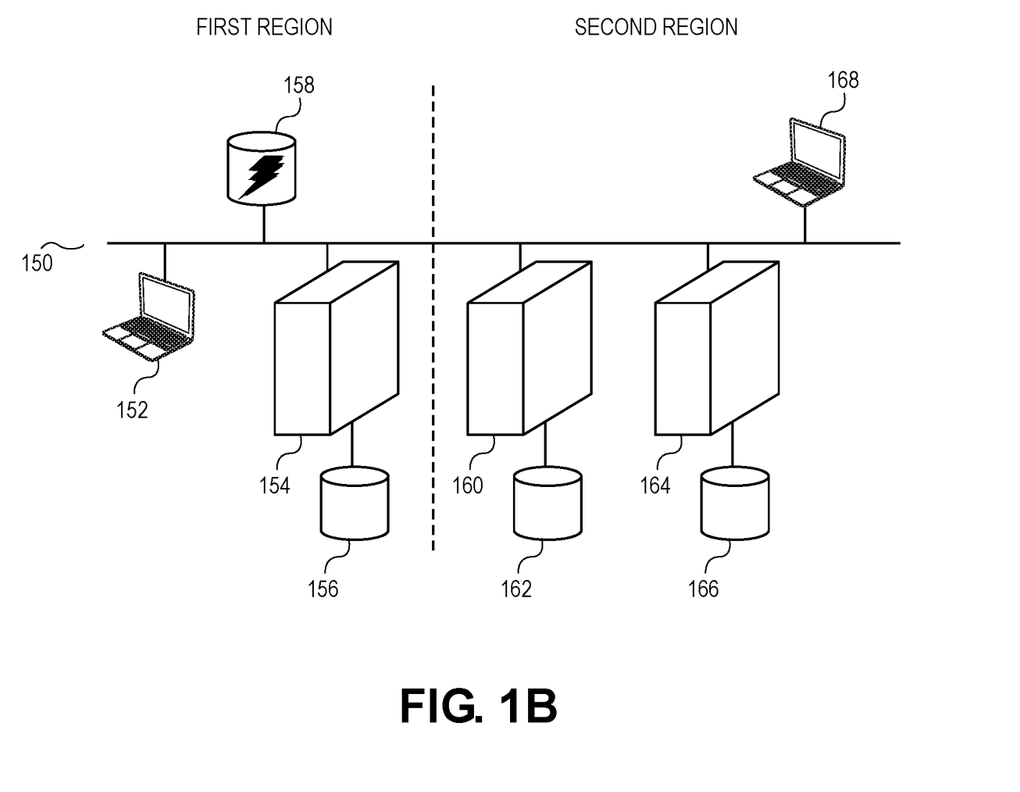
FIG. 1B depicts an exemplary diagram illustrating the components of a system for carrying out embodiments of the invention.

Turning now to FIG. 1B, an exemplary diagram illustrating the components of a system for carrying out embodiments of the invention is depicted and referred to generally by reference numeral 150. System 150 comprises a number of computers such as computer 102 and data stores such as data store 130. As depicted, the components of system 150 are located in two distinct geopolitical areas, with the components on the left side of the dashed line being located in the first geopolitical area and the components on the right side being located in the second geopolitical area. For example, the first geopolitical area might be the United States while the second geopolitical area is the European Union. Alternatively, the first geopolitical area could be California while the second geopolitical area is Virginia. In some embodiments, components of the system may be present in more than two geopolitical areas. For example, a first set of components of system 150 may be located in the United States, a second set may be located in the European Union and a third set may be located in the Russian Federation. Embodiments of the invention are particularly useful when the different geopolitical areas have different laws regarding data storage, privacy, and retention. For example, an organization organized under the laws of a first geopolitical area may be required (or may prefer) to store their data in that geopolitical area. However, embodiments of the invention are contemplated across any set of geopolitical areas.

First client device 152 is located in the first geopolitical area. For the sake of brevity in this description, the first geopolitical area will be the United States; however, a person skilled in the art will appreciate that it could also be any other geopolitical area. Alternatively, the first client could be located in the second geopolitical area or in a third geopolitical area (not shown). Broadly speaking, client device 152 can be any type of computing device discussed above with respect to FIG. 1; however, in a typical embodiment, first client device 152 may be a desktop computer, laptop computer, or mobile device such as a smartphone. The first client device 152 allows a user to interact with the group-based communication system. In some embodiments, first client device 152 may be running dedicated software for the group-based communication system. In other embodiments, the user may access the group-based communication server by visiting a website using a web browser on first client device 152. Although only a single client device is depicted in the first geopolitical area, the group-based communication system may have a large number of users in any given geopolitical area, and each of the user may access the group-based communication system from any number of client devices. In some embodiments, the group-based communication system is a channel-based messaging platform.

Also located in the first geopolitical area is group-based communication server 154. Group-based communication server is communicatively coupled to first client device 152 via a network such as network 126 or Internet 132 and allows the various client devices of the user to exchange messages by posting them to groups. Group-based communication server 154 is also communicatively coupled to group-based communication system data store 156. As depicted, group-based communication server 154 is directly connected to group-based communication system data store 156; however, embodiments where group-based communication server 154 is connected to group-based communication system data store 156 (as, for example, where group-based communication system data store 156 is network-based storage or cloud storage) are also contemplated. Group-based communication system data store 156 stores a portion of the data for the group-based communication system, including message data, group (or channel) data, and user data. In particular, group-based communication system data store 156 stored data that is designated to be stored in the first geopolitical area. For data that is designated to be stored in a different geopolitical area (such as the second geopolitical area), group-based communication system data store 156 may instead store a pointer to the data or other information identifying the storage location of the data. As discussed below, some or all of the data in group-based communication system data store 156 may be stored in encrypted form. For example, data may be stored encrypted using customer-managed keys.

In order to reduce latency associated with fetching keys (for example, if keys are stored in the second geopolitical area), recently used keys able to decrypt the data in group-based communication system data store 156 may be cached in key cache 158. For example, a key could remain valid for a period of five minutes after it is initially fetched from a key server. If the same key is required (for example, to decrypt another message stored on group-based communication system data store 156) within that period, it can be retrieved from key cache 158 instead of having to be re-fetched from a (potentially out of area) key store, thereby reducing latency. A person skilled in the art will appreciate that keys can be cached for different period of time, and that different keys could be cached for different lengths of time. A person skilled in the art would further appreciate the tradeoff between the reduced latency associated with accessing a key from the key cache and the increased cache size (and potential customer desire to minimize the time that keys are located out of their designated storage region).

Turning now to the second region, second region group-based communication system server 160 may, in some embodiments, be analogous to group-based communication system data store 156 for clients (such as second client device 168) located in the second geopolitical area. In other embodiments, clients (such as first client device 152 and second client device 168) communicate with a single group-based communication system server (for example group-based communication system server 154) regardless of the region in which they are located, and the central group-based communication system server stores and retrieves message data (appropriately encrypted) in the appropriate geopolitical area. In such embodiments, second region group-based communication system server 160 may not be client-facing, but instead be the interface by which the central group-based communication system server interacts with the regional data store (here, second region group-based communication system data store 162). In some embodiments, second region group-based communication system data store 162 additionally stores organization and channel metadata. For example, channel membership data and search indices for the organization may be stored in the designated region. Similarly, logging data for the organization may be stored in second region group-based communication system data store 162 if so designated by the organization.

As described above, certain data may be designated for storage in a particular geopolitical area. This designation may be based on a customer setting or local laws associated with customers in that particular geopolitical area. In response to such a designation, the group-based communication system with which the client device is communicating stores data to (and retrieves data from) a group-based communication system data store (such as first region group-based communication data store 156 or second region group-based communication system data store 162) in the appropriate geopolitical area. This process is discussed in detail below.

Also in the second geopolitical area are second region key server 164 and second region key data store 166. Broadly, second region key server 164 manages all aspects of encryption keys for the second geopolitical area. For example, second region key server 164 generates new encryption keys when they are required, rotates and revokes keys for the second geopolitical area, and stores and retrieves encryption keys to and from second region key data store 166. In some embodiments, second region key server 164 is not client facing, but rather interacts only with the appropriate group-based communication system server to provide the keys necessary to encrypt data prior to storage and decrypt data upon retrieval. In some embodiments, the keys used to encrypt a particular data item (for example, a particular message posted in the group-based communication system) are stored in the same geopolitical area as the data item is stored. Thus, for example, a key would be stored in second region key data store 166 to decrypt data stored in second region group-based communication system data store 162. In other embodiments, encrypted data and the corresponding encryption keys are stored in separate geopolitical areas. This can be advantageous, for example, to ensure that no single jurisdiction can access the data alone. In some embodiments, only a single physical server is present in a particular geopolitical area that implements the functions described above with respect to that geopolitical area. For example, second region group-based communication system server 160 may be the same physical server as second region key server 164. In some such embodiments, the different servers may run on different virtual machines or containers on the same physical server. In other embodiments, the different servers may be implemented in a scalable fashion such that additional group-based communication system servers and/or key servers can be spun up upon demand, and these servers may run on the same hardware, different hardware, or any combination thereof.

Figure 2:
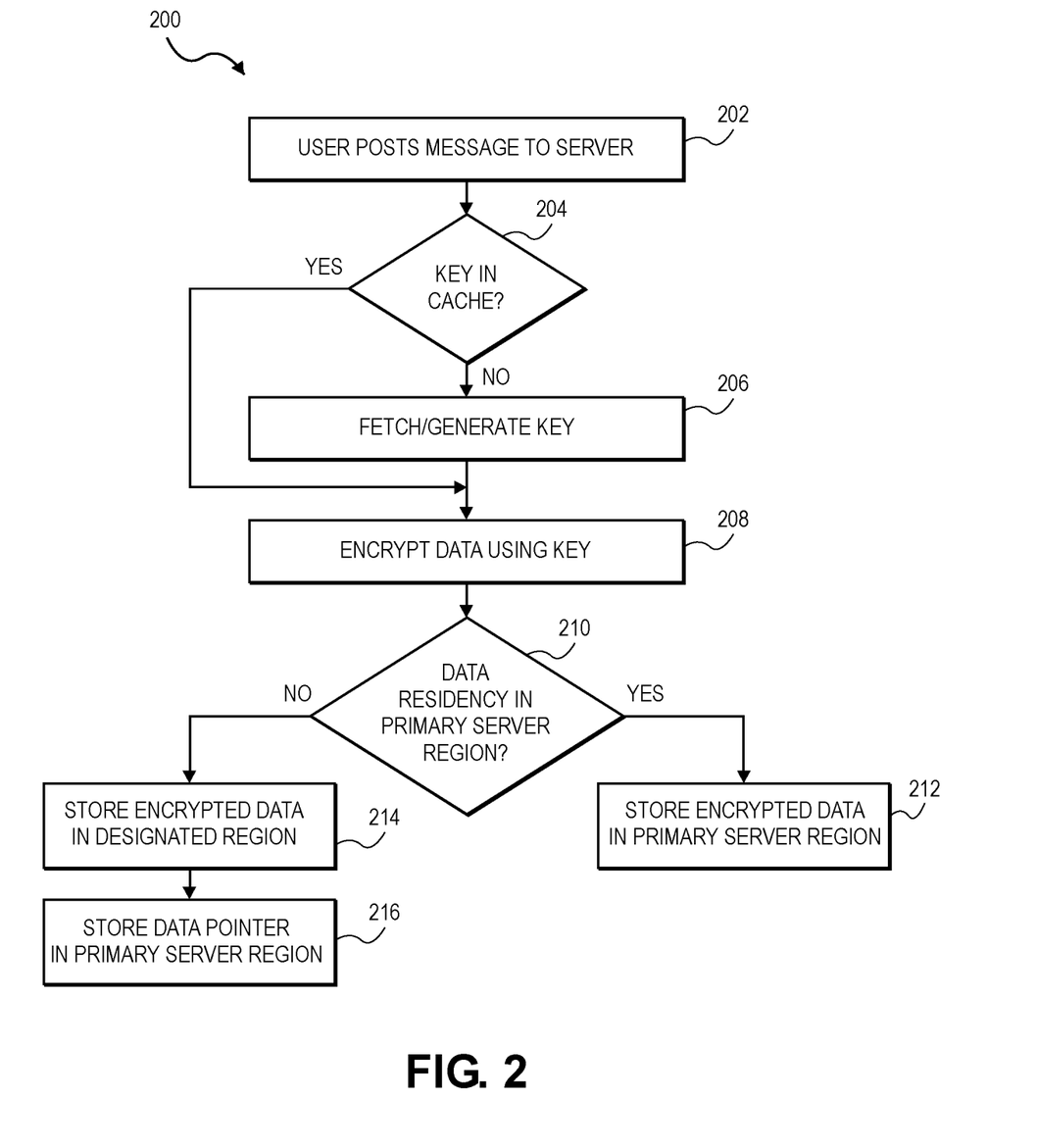
FIG. 2 depicts a flowchart illustrating the operation of a method for storing an encrypted message in a designated geopolitical area in accordance with embodiments of the invention.

Turning now to FIG. 2, a flowchart illustrating the operation of a method for storing an encrypted message in a designated geopolitical area in accordance with embodiments of the invention is depicted and referred to generally by reference numeral 200. The method begins at a step 202, where a user of the group-based communication system posts a message to a group of the group-based communication system. Broadly speaking, this message may be any information to be shared with the group, such as textual content, a document, an image, a reaction to (or acknowledgment of) another message, use information, a change in group membership, or any other information stored in a group-based communication system data store such as first region group-based communication system data store 156 or second region group-based communication system data store 162. In the embodiments of the invention discussed below, this message is to be stored in encrypted form. In some embodiments, all messages are stored in encrypted form; in other embodiments, only certain messages are stored in encrypted form. In order to encrypt the message, an appropriate encryption key is required. In some embodiments, this encryption key may be managed by an organization (e.g., a company) of which the user is a member. As discussed above, the organization may designate a geopolitical area in which the (encrypted) message is to be stored and a geopolitical area (which may be the same or different) in which encryption keys are to be managed.

Processing proceeds to test 204, wherein the group-based communication system checks the local key cache to determine whether the needed key is stored locally. In some embodiments, recently used keys are retained in a key cache local to the group-based communication system server for a caching period (such as five minutes, ten minutes, one hour, one day or any other appropriate duration) to avoid the need to refetch frequently used keys from a different geopolitical area where they are managed. This can save considerable resources over re-fetching keys each time they are needed, as the principle of spatiotemporal locality suggests that a user who posts a message requiring a particular key is likely to post a second message requiring the same key within a short time interval. In some embodiments, keys are flushed from the cache after this duration; in other embodiments, expired keys are flushed from the cache. In still other embodiment, a fixed-size cache retains a fixed number of the most recently-used keys, with older (or expired) keys being purged as new keys are required and fetched from the appropriate key server. In some embodiments, when a key is accessed from the cache, the retention period is reset or otherwise extended. In some embodiments where keys expire, accessing a key from the key cache may cause the lease for that key to be renewed. If the key cannot be located in the key cache, processing moves to step 206; if the key is found in the cache processing instead skips to step 208.

At step 206, having determined that the necessary key is not in the key cache, the group-based conversation system server fetches the key from the appropriate key server. In general, the appropriate key server will not be in the same geopolitical area as the group-based conversation system server; however, if the user's organization has designated the user's local region as the geopolitical area for key storage for that organization, then the key server in the same geopolitical area as the local group-based communication system server may be used. Broadly speaking, a key hierarchy to allow organizations to manage their keys may be employed. For example, an organization may have a master organization key, which is used to authenticate per-workspace keys, which in turn can be used to sign per-channel keys, which can be used to generate session keys (for example, keys rotated hourly). A person of skill in the art, having reviewed this disclosure will appreciate that any of a variety of key hierarchies can be employed with the invention. If needed, the appropriate key server may generate a new key upon the group-based conversation system server requesting a key. For example, if hourly session keys are employed, and no messages have been posted in the particular channel since the session keys rotated, a key may be generated on demand using key generation material stored in the key data store. In some embodiments, multiple keys may be generated in response to a message being posted. This may be the case, for example, if the message results in a new workspace or channel being created.

Next, after the key has been generated or retrieved from the key cache, processing proceeds to step 208, where the received message is encrypted using the appropriate key. A person skilled in the art will appreciate that a variety of encryption algorithms can be employed for this step, including the AES, Twofish, Serpent, and Blowfish encryption algorithms. In some embodiments, symmetric key encryption is used to encrypt the message; in other embodiments, asymmetric encryption is used to encrypt a symmetric encryption key which is used to encrypt the message. In some embodiments, cipher block chaining or stream ciphers may be employed to ensure that key reuse does not result in a lack of diffusion in the ciphertext.

Next, at test 210, it is determined whether the region designated by the user's organization for storage of data is the same geopolitical area in which the group-based conversation system server is located. If so, processing proceeds to step 212; otherwise processing instead proceeds to step 214. In those embodiments where only a single the group-based conversation system server is present, this determination simply tests whether the user's organization has designated the geopolitical area corresponding to that single server as the geopolitical area for data residency. In embodiments with multiple the group-based conversation system servers, test 210 may instead compare the location of a master index for indicating where data is stored rather than the specific the group-based conversation system server with which the user is communicating.

If the user's organization has designated the geopolitical area of the group-based conversation system server (or the master data index) as the region in which that organization's data should reside, then the encrypted message generated at step 208 is stored in the group-based conversation system data store for that region at step 212. Encryption metadata may be stored with the encrypted message to identify the appropriate key for decryption. In some embodiments, a different key may be used for each message (or for a small group of messages) and stored (encrypted with the appropriate key in the organization's key hierarchy) with the message.

If it is determined at test 210 that the designated geopolitical area for the organization is different from the primary storage region, the encrypted message is instead stored in a group-based communication system data store for the geopolitical area designated by the user's organization (such as, for example, second region group-based communication system data store 162). As described above with respect to step 212, encryption metadata may be stored in association with the encrypted message (following the example above, in second region group-based communication system data store 162).

Next, at step 216, a pointer (or other information identifying the storage location of the encrypted message) is stored in the group-based communication system data store for the primary storage region. In this way, messages can be retrieved by first consulting the group-based communication system data store for the primary storage region and then, if a pointer is found, using the location it contains to retrieve the encrypted message from the group-based conversation system data store for the designated geopolitical area. In some embodiments, encryption metadata may be stored with the pointer so that the key data can be fetched in parallel with the encrypted message data for decryption in order to minimize latency. In some embodiments, newly posted encrypted messages, like recently used keys, may be cached in the primary storage region for a predetermined caching period (such as, for example, 5 minutes, one hour or one day) such that they can quickly be fetched without requiring them to be re-fetched from the designated region when other channel members initially view them.

Figure 3:
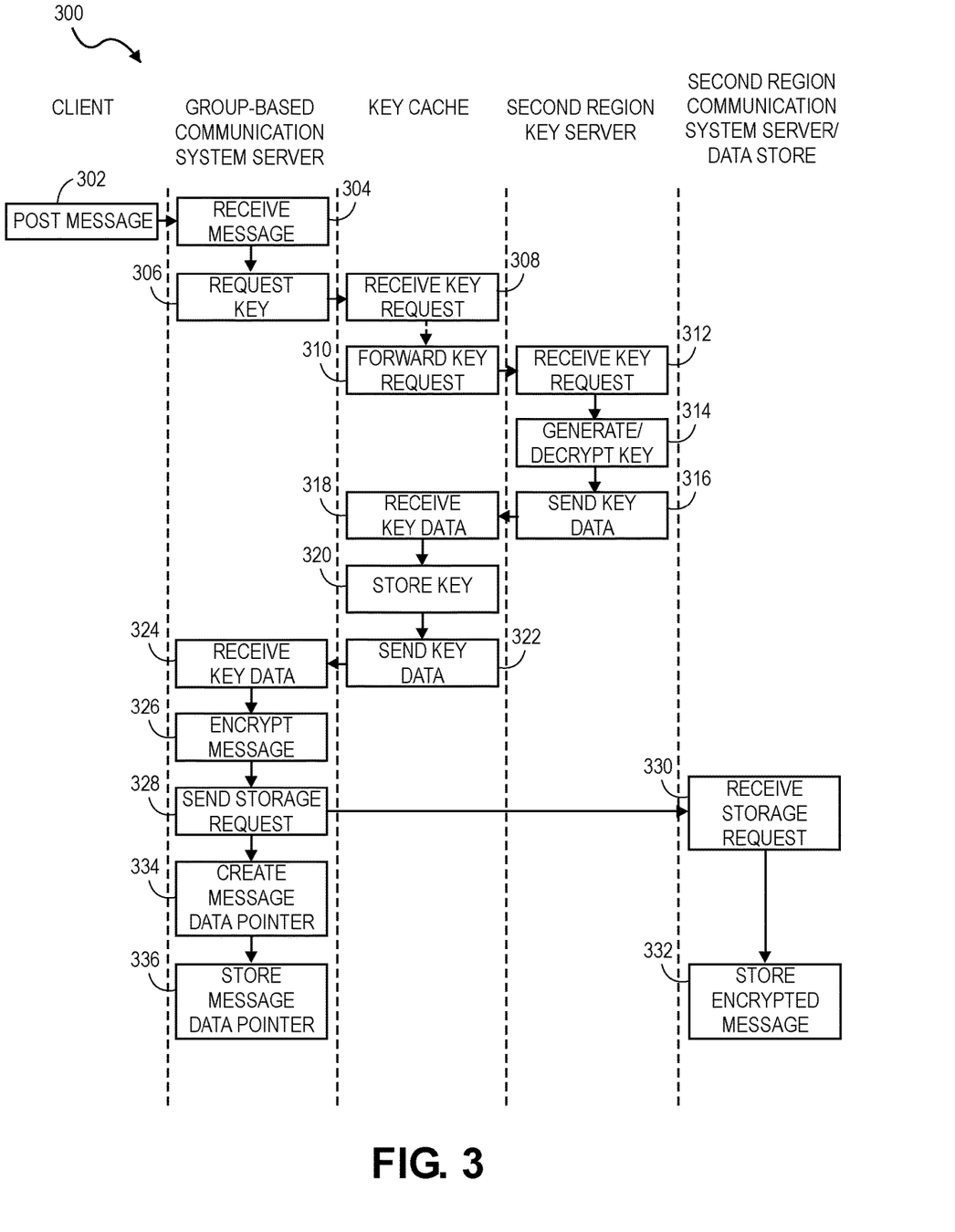
FIG. 3 depicts a swim lane diagram illustrating the component responsibility flow of a process for storing an encrypted message in a designated geopolitical area in accordance with embodiments of the invention.

Turning now to FIG. 3, a swim lane diagram illustrating the component responsibility flow of a process for storing an encrypted message in a designated geopolitical area in accordance with embodiments of the invention is depicted and referred to generally by reference numeral 300. For the purposes of diagram 300, the designated storage region for the user's organization is different from the primary region for the group-based communication system server, although this will not necessarily be the case.

The process begins at the user's client device at step 302, where the user creates and posts a message. As described above, this message may be textual content, a document, an emoji/reactji, or any other form of content to be shared with other users in the group-based communication system. This message is transmitted to the group-based communication system server via a communication channel established between software running on the user's client device and server software for the group-based communication system. In some embodiments, this communication channel is encrypted using transport later encryption such as SSL, TLS, or HTTPS encryption.

Control then switches to the group-based communication system server, which receives the message at step 304. After determining that the message should be encrypted (per the designation of the user's organization), the system determines the appropriate key scope for encrypting the message and, at step 306, sends a message to the key cache to check for the corresponding key. Control then passes to the key cache.

In some embodiments, as discussed below, the key cache is a lookthrough cache, such that when the key cache receives the key request from the group-based communication system server (step 308), it returns the key immediately if the key is in the cache (i.e., it skips directly to step 322). Otherwise, the key cache is responsible for requesting the key from the appropriate key server (steps 310-320) before returning it to the group-based communication system server at step 322. In other embodiments (not shown) the key cache is a lookaside cache, where the key cache returns a "key not found" indication if the key is not in the cache and the group-based communication system server is responsible for requesting the key from the key server and then storing it in the cache. A person skilled in the art will, having reviewed this disclosure, understand how to adapt the teachings below to utilize a lookaside cache instead of a lookthrough cache.

After receiving the key request at step 308, and assuming that the key is not already in the cache, the key cache forwards the key request (including the key scope) at step 310 to the key server in the geopolitical area designated by the user's organization, and control passes to the key server. At step 312, the key server in the designated geopolitical area receives the key request, including the requested key scope. In some embodiments, the key server may have a local key cache similar to the key cache in the first geopolitical area that is consulted first to determine whether the desired key has been recently requested. At step 314, the key server retrieves or generates the requested key as needed. Generation of a new key may be needed if, for example, keys for a particular channel have been rotated sine the last time a message was posted in that channel. In some embodiments, encryption keys are themselves stored in encrypted form. Once the key server has the requested key, it replies at step 316 to the request with the desired key. Control can then return to the key cache.

At step 318, the response with the desired key is received at the key cache, and at step 320 the key cache stores the key to speed future retrievals. As discussed above, keys may be cached for a limited period of time. In some embodiments, keys are cached for a fixed period of time, such as five, minutes, one hour or one day. In other embodiments, keys (such as session keys) are cached until their scope expires. Once the key has been added to the cache (or if it was already present in the cache), the key server can send the requested key data to the group-based communication system server at step 322, and control now returns to the that server.

At step 324, the group-based communication system server receives the requested key with the appropriate scope. In embodiments using a lookthrough cache, the process is identical (from the standpoint of the group-based communication system server) whether the key was retrieved directly from the key cache or had to be fetched from the key server. Using the received key, the group-based communication system server encrypts the message with the appropriate key at step 326, thereby creating an encrypted version of the message (or ciphertext). Next, at step 328, group-based communication system server sends a storage request including the encrypted message to the group-based communication system server (or directly to the group-based communication system data store) in the geopolitical area specified by the user's organization. As discussed above, the geopolitical area designated for data storage may be the same as or different from the geopolitical area specified by the user's organization for key management.

Control passes to the designated region group-based communication system server/data store at step 330, where it receives the storage request with the encrypted message. At step 332, the designated region group-based communication system server/data store stores the message in the designated geopolitical area for later retrieval. In some embodiments, the encrypted message is stored in association with the user's organization (for example, in a database shard dedicated to that organization). In other embodiments, the encrypted message is stored together with other encrypted data, such that there is no way to tell based solely on the encrypted message data which encrypted data messages are associated with a particular organization.

After step 332 (or concurrently with steps 330 and 332) control returns to the group-based communication system server. At step 334, that server creates a pointer (or other information enabling access) to the encrypted message stored in the group-based communication system server. In some embodiments, this pointer is created based on information (such as, for example, a unique row identifier) returned by the group-based communication system server. In other embodiments, the pointer is created prior to sending the storage request at step 334 and a unique record identifier enabling later retrieval is included with the storage request. In some embodiments, the pointer may include a unique record identifier for the encrypted data together with indicia of the geopolitical area in which the encrypted data is stored. At step 336, this pointer is stored in the primary group-based communication system data store to enable later retrieval of the message. For example, the pointer may be stored where an unencrypted message (or an encrypted message designating the primary geopolitical area as the storage region) would be stored and include a flag to indicate that it is a pointer rather than message data. Once the encrypted message data and the pointer to the encrypted message data have been stored, process 300 terminates.

Figure 4:
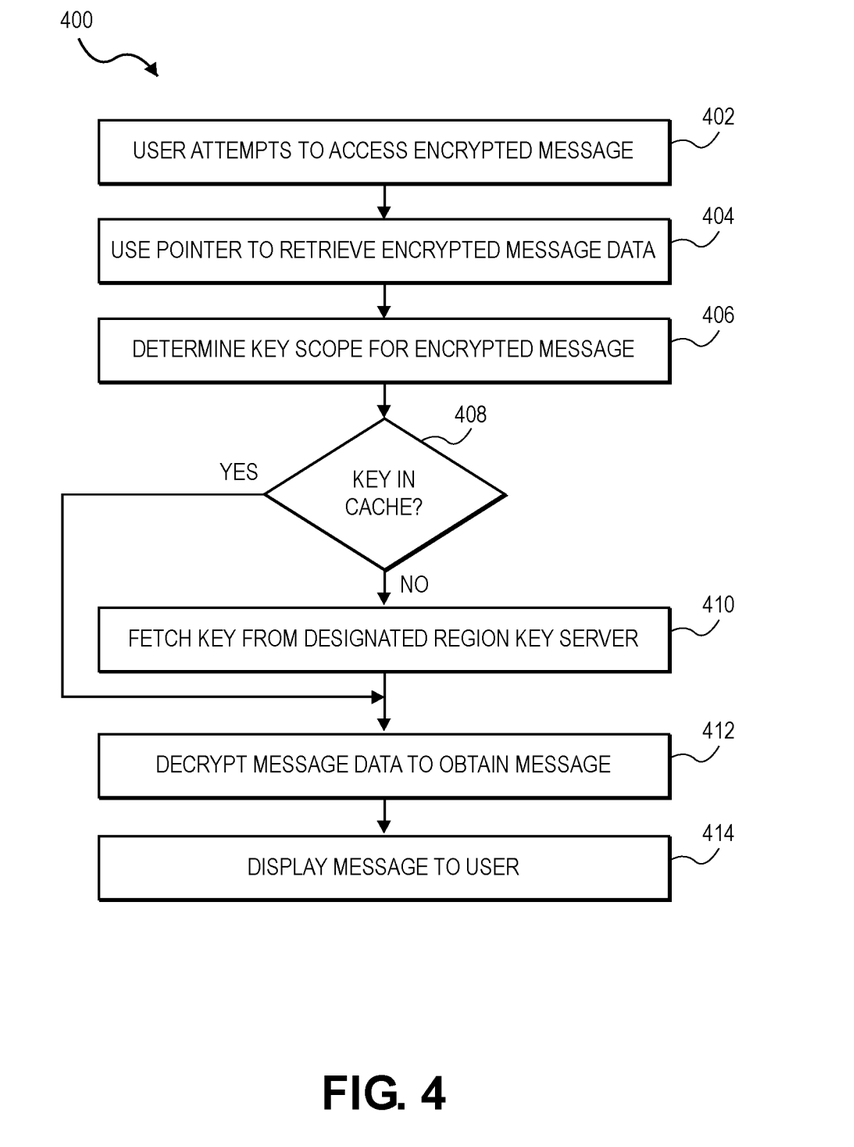
FIG. 4 depicts a flowchart illustrating the operation of a method for accessing an encrypted message stored in a designated geopolitical area.

Turning now to FIG. 4, a flowchart illustrating the operation of a method for accessing an encrypted message stored in a designated geopolitical area is depicted and referred to generally by reference numeral 400. Initially, at a step 402, a user associated with the organization and using a client device such as client device 152 or client device 168 attempts to access the encrypted message. For example, the user may open a particular channel or group that includes the message in its conversation history. In some embodiments, a process substantially similar to process 400 is carried out for each message in the conversation history. In other embodiments, a conversation history may include a mixture of encrypted messages and unencrypted messages. In still other embodiments, a conversation history may include messages from users associated with different organizations, each with its own encryption policy and data residency policy configured.

When accessing a message (encrypted or unencrypted) a data record is retrieved from the primary region group-based communication system data store. This data record may include message data (encrypted or unencrypted) or a pointer to message data stored in a different geopolitical area, created as described above with respect to method 200 and process flow diagram 300. For the purposes of this discussion, it is assumed that the data record contains a pointer to message data stored in a different geopolitical area; however, a skilled person, having reviewed this disclosure, will be able to understand how this method can be adapted to those cases where the record included encrypted or unencrypted message data instead.

Next, processing proceeds to step 404, where the pointer is used to retrieve the encrypted message data from the appropriate group-based conversation system data store. For example, the pointer may be unpacked to identify a geopolitical area and a record identifier, as described above. Then the group-based conversation system server in the primary region can send a request using the record identifier to the group-based conversation system server (or directly to the group-based conversation system data store) for the designated geopolitical area. That server (or data store) can then respond with the encrypted message data.

The method continues at step 406, when the encryption metadata is used to determine the appropriate key scope useable to decrypt the encrypted message. For example, encryption metadata may include a unique record identifier included in the pointer and/or information indicative of the type of data stored in the encrypted message (such as, without limitation, a channel post, user data, a shared file, and encryption key). Alternatively or in addition, the encryption metadata may include a key identifier or information usable to determine a key identifier of a decryption key to decrypt the message data. For example, the encryption metadata may include (some or all of) an organization identifier, a workspace identifier, a channel identifier and a session identifier (e.g., a timestamp), each of which (or the set of which) may correspond to a key scope. As a concrete example of this, a particular encrypted message may store a particular channel key used to protect session keys for that channel. The encryption metadata for that encrypted message may include a unique record identifier, a type field indicating that the encrypted message is a channel key, key lifespan data for the key, a key scope (here, a channel identifier) for the key, and organization and workspace identifier for the key. A person skilled in the art, having reviewed this disclosure, will appreciate that a variety of non-sensitive information can be stored as encryption metadata for a particular encrypted message.

In some embodiments, the encryption metadata is stored with the encrypted message. In other embodiments, the encryption metadata is stored with the pointer. In still other embodiments, the encryption metadata is determined from the conversation history as needed. For example, it may be that the appropriate key scope can be determined knowing the organization, the channel in which the message was posted, and the time at which the message was originally posted. This information may be included in the conversation history, such that the encryption metadata is stored separately from the pointer and the encrypted message data.

Processing next moves to test 408, where it is determined whether the appropriate key is in the key cache. If the key is present in the key cache, processing can skip to step 412, otherwise, processing instead proceeds to step 410. At step 410, the group-based communication system server fetches the key corresponding to the previously determined key scope from the key server in the geopolitical area designated by the user's organization for key storage. Step 410 is analogous to step 206, and the same techniques and variations described with respect to fetching keys for encryption can similarly be employed for fetching keys for decryption as well.

Once the appropriate key has been retrieved, or if the appropriate key was already present in the key cache, processing can proceed to step 412, where the encrypted message data is decrypted. The decryption of step 412 is the converse of the encryption of step 208. A person skilled in the art, upon reviewing this disclosure, will appreciate that a decryption algorithm corresponding to the encryption algorithm of step 20 should be employed. In some embodiments, the same key is used for encryption and decryption. In other embodiments, distinct (but corresponding) keys are used for encryption and decryption. As with the encryption process, any encryption algorithm, now known or later developed, is contemplated for use with the invention. Finally, at step 414, the decrypted message is returned to the client to be displayed to the user. Method 400 may terminate at this point, or may repeat to decrypt additional messages for display to the user.

Figure 5A:
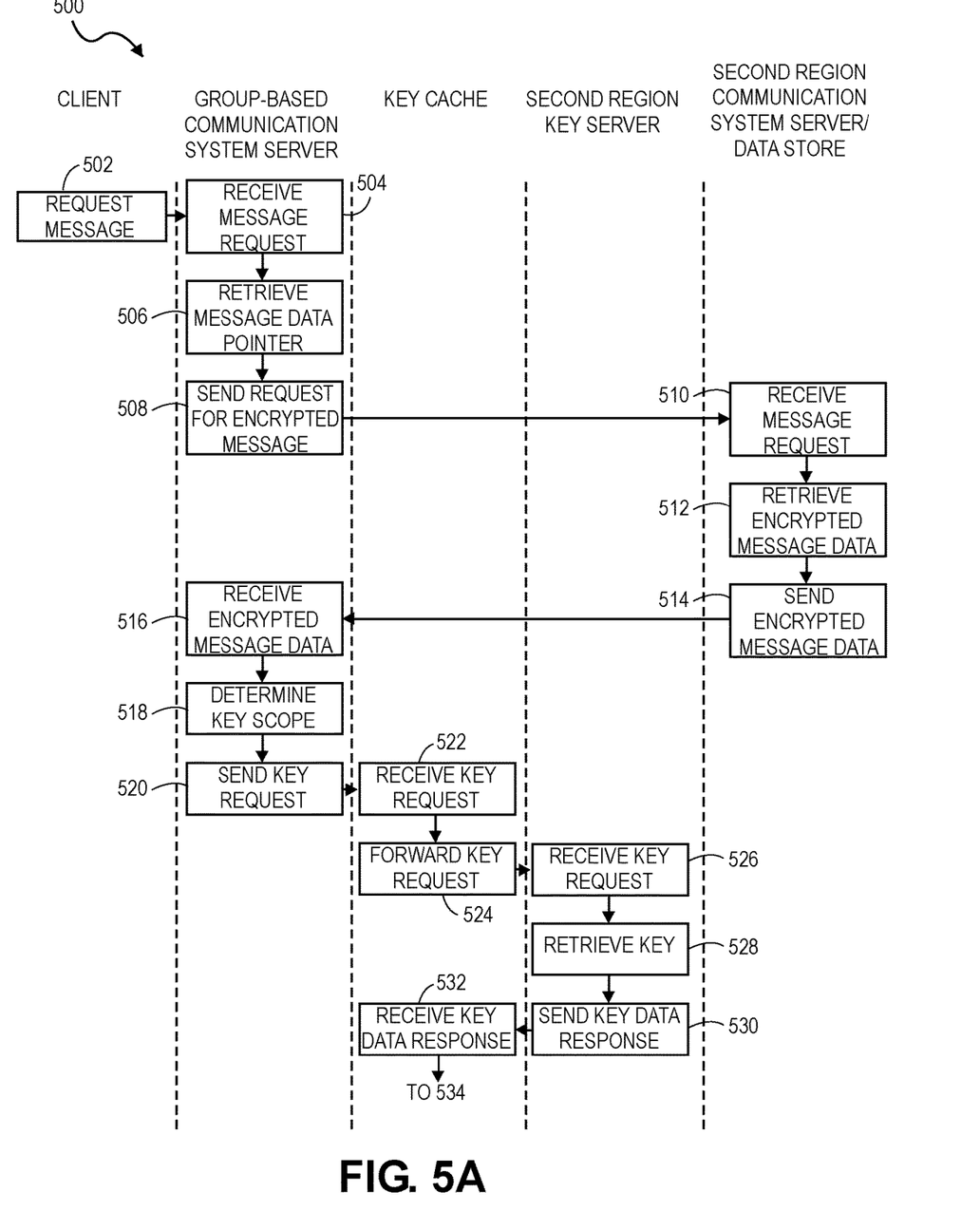
FIGS. 5A and 5B collectively depict a swim lane diagram illustrating the component responsibility flow of a process for accessing an encrypted message stored in a designated geopolitical area in accordance with embodiments of the invention.
Figure 5B:
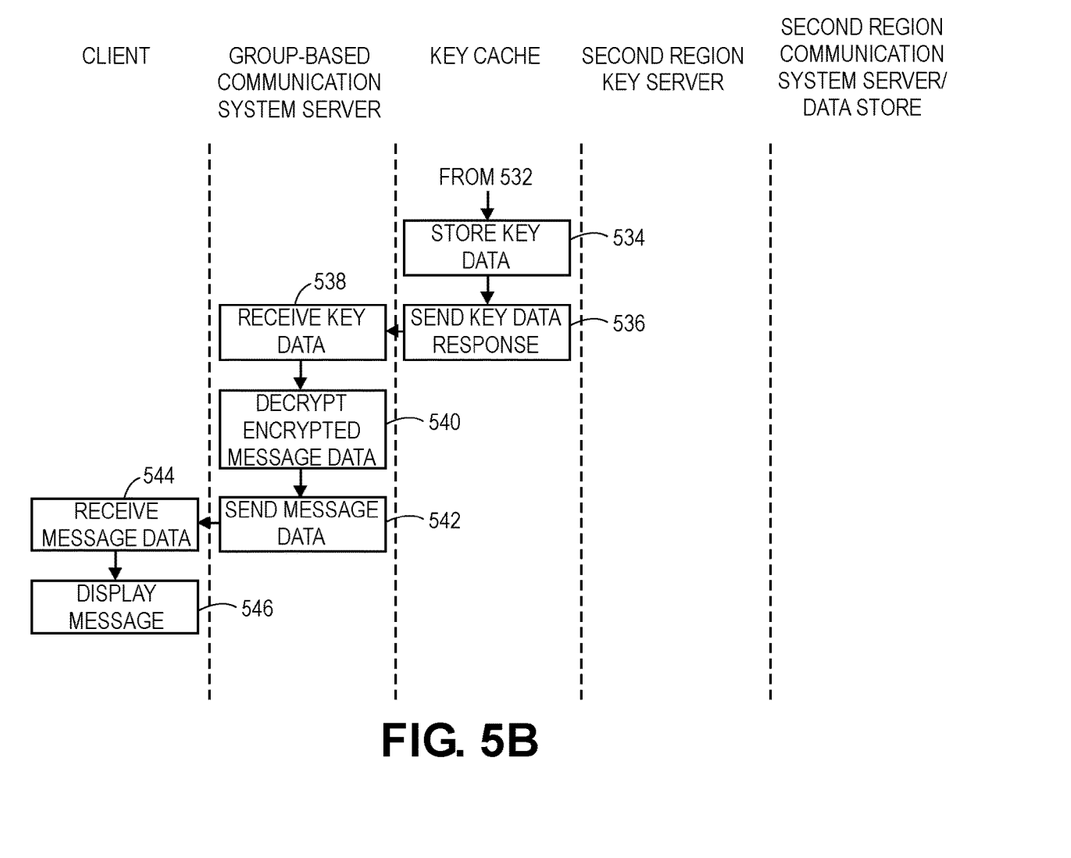

Turning now to FIGS. 5A and 5B together, a swim lane diagram illustrating the component responsibility flow of a process for accessing an encrypted message stored in a designated geopolitical area in accordance with embodiments of the invention is depicted and referred to generally by reference numeral 500. Process 500 begins at the client device at step 502 where, responsive to a user attempt to access a message, the client sends a request for message data to the group-based communication system server. The user's attempt to access the message may be explicit (such as, for example, selecting the message) or implicit (such as, for example, accessing a channel containing the message or scrolling to view the history of a conversation). In some embodiments, messages may be decrypted one at a time. In other embodiments, messages may be decrypted in batched. For example, if a user is scrolling through a conversation history in a particular channel, the client may send a single request for all messages that would be visible in the view pane of the client. Alternatively, the client may request all messages that would be visible in the view pane and also additional message to display should the user keep scrolling. As still another alternative, all messages sharing a particular key scope (for example, all messages using the same session key) may be requested when the user views the first message using that session key.

Control then moves to the group-based communication system server at step 504, when the server receives the request for the message. In some embodiments, requests for multiple messages in a conversation history may be grouped together into a single request. In some such embodiments, such a grouping of requests may include requests for message that are encrypted with different keys (for example, messages controlled by different organization or messages posted at different times) or unencrypted. Such grouped requests may be unpacked and processed individually and individual responses or a grouped response provided to the client device.

Next, at step 506, the group-based communication system server retrieves the data pointer from the local group-based communication system data store. For example, the request for the message may include a record identifier or a timestamp and channel indication sufficient to identify the message. As discussed previously, it is assumed for the purposes of this example that the message to be retrieved is stored in a different geopolitical area than that of the primary group-based communication system server; however, a person skilled in the art will appreciate that the techniques disclosed herein can also be applied to the case where the encrypted message data is stored in the geopolitical area of the primary group-based communication system server. Once the data pointer has been retrieved from the data store, it can be used as described above with respect to FIG. 4 to generate and send a request to the group-based communication system server or data store for the designated geopolitical area at step 508.

Control then passes to the second geopolitical area group-based communication system server/data store, which receives the request at step 510. Based on the information included in the request (such as, for example, a record identifier corresponding to the encrypted message as discussed above with respect to method 200 and process 300), the server can retrieve the encrypted message data from the corresponding data store (or the data store can retrieve it directly) at step 512. Finally, at a step 514, the server or data store generates a response message including the encrypted message data corresponding to the request and transmits it to the group-based communication system server for the primary geopolitical area, and control returns to that server.

At step 516, the primary region group-based communication system server receives the encrypted message data from the geopolitical area designated by the user's organization for data residency. Next, at step 518, the group-based communication system server determines the appropriate key scope for the encrypted message. As discussed above, the appropriate key scope may be determined from the message data pointer, the message data, the conversation history, or from another source that stores the relevant information. Based on the determined key scope, the group-based communication system server sends a request at step 520 to the key cache for the key matching the determined key scope.

Control passes to the key cache at step 522, when it receives the request for the key. If the key is already stored in the key cache, process 500 can proceed directly to step 536, skipping steps 524-534. Otherwise, the key cache proceeds to step 524 where it forwards the received key request to the key server in the designated region. A person skilled in the art will appreciate that the key request received from the group-based communication system server may be forwarded or, equivalently, a new request for the same key can be generated and sent to the key server in the designated region.

At step 526, the key server for the geopolitical area designated by the user's organization receives the request and control shifts to the key server. Next, at step 528, the key server retrieves the requested key. As discussed above, the keys may be themselves stored in encrypted form. Alternatively, encryption keys may be regenerated upon demand. Finally, at step 530, a response including the requested key is generated and sent back to the key cache.

At step 532, the key cache receives the response from the key server for the designated geopolitical area including the requested key. At step 534, the key cache stores the key (for a predesignated period of time, until it expires, or until it is evicted to make room for another key) to avoid the need to refetch it if it is requested again soon. Finally, at step 536, whether the key was already in the cache or was retrieved from the designated key server, the key cache send a response with the requested key to the group-based communication system server, and control returns to that server.

At step 538, the primary group-based communication system server receives the key data and, at step 540, uses it to decrypt one or more encrypted messages included in the request received from the client device based on the user's actions. Finally, at step 542, the group-based communication system server sends the decrypted message to the client device. In some embodiments, the decrypted message may be protected by transport-layer encryption (such as, for example SSL, HTTPS, or TLS) in transit. Control then return back to the client device, which receives the decrypted message or messages at step 544 and displays it for the user at step 546. At this point, process 500 may terminate, the user may request an additional message or messages (causing process 500 to repeat), or the user may post a response, causing process 300 to be carried out. In some embodiments, messages using different key scopes may be interleaved when viewed. This may be the case, for example, when a user is viewing a shared channel or search results. In such embodiments, decrypted messages may be held until responses corresponding to all messages whose decryption was requested have been received. In other embodiments, decrypted messages are held until responses have been received for all messages appearing before them in the display have been received, such that messages are displayed in order. In still other embodiments, decrypted messages are displayed, with placeholders displayed for encrypted messages for which decryption responses have not yet been received.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for providing encryption key management for international data residency, the system comprising:
   a first data store, located in a first geopolitical area;
   a second data store, located in a second geopolitical area distinct from the first geopolitical area;
   a group-based communication system server, located in the first geopolitical area and programmed to:
   receive, from a first client device of a first user associated with an organization, a message to be posted to a group of a group-based communication system;
   determine, based on the organization, that data associated with the organization should be stored in the second geopolitical area;
   encrypt, as an encrypted message, the message using an organization-specific encryption key;
   store information indicative of a storage location for the encrypted message in the first data store;
   store the encrypted message in the second data store;
   receive, from a second client device of a second user associated with the organization, an indication of an attempt to access the message;
   retrieve, from the first data store, the information indicative of the storage location for the encrypted message;
   retrieve the encrypted message from the second data store using the information indicative of the storage location for the encrypted message;

decrypt, as a decrypted message, the message using an organization-specific decryption key; and transmit, to the second client device of the second user, the decrypted message.

2. The system of claim 1, wherein the organization-specific encryption key is the same as the organization-specific decryption key.

3. The system of claim 1, wherein the organization-specific encryption key and the organization-specific decryption key form an asymmetric key pair.

4. The system of claim 1, further comprising a key server located in the second geopolitical area storing the organization-specific encryption key and the organization-specific decryption key, and wherein the group-based communication system server is further programmed to:

retrieve, from the key server, the organization-specific encryption key responsive to receiving, from the first client device of the first user, the message to be posted to the group; and retrieve, from the key server, the organization-specific decryption key responsive to receiving, from the second data store, the encrypted message.

5. The system of claim 4, further comprising a key cache in the first geopolitical area programmed to cache keys received from the key server.

6. The system of claim 1, wherein the second data store stores logging data for the organization.

7. The system of claim 1, wherein the indication of the attempt to access the message comprises a selection by the second user of the group to view in the group-based communication system.

8. A method for providing encryption key management for international data residency, the method comprising:

receiving, by a group-based communication system server and from a first client device of a first user associated with an organization, a message to be posted to a group of a group-based communication system, wherein the group-based communication system server is located in a first geopolitical area;

encrypting, as an encrypted message, the message using an organization-specific encryption key;

determining, by the group-based communication system server and based on the organization, that data associated with the organization should be stored in a second geopolitical area that is distinct from the first geopolitical area, responsive to determining that the data should be stored in the second geopolitical area, storing the encrypted message in a second data store located in the second geopolitical area;

storing information indicative of a storage location for the encrypted message in a first data store located in the first geopolitical area;

receiving, by the group-based communication system server and from a second client device of a second user associated with the organization, an indication of an attempt to access the message;

retrieving, by the group-based communication system server and from the first data store, the information indicative of the storage location for the encrypted message;

retrieving, by the group-based communication system server, the encrypted message from the second data store using the information indicative of the storage location for the encrypted message;

decrypting, by the group-based communication system server and as a decrypted message, the message using an organization-specific decryption key; and transmitting, by the group-based communication system server and to the second client device of the second user, the decrypted message.

9. The method of claim 8, further comprising:

receiving, from the first client device of the first user, the message to be posted to the group;

responsive to receiving the message to be posted to the group, retrieving, by the group-based communication system server and from a key server located in a third geopolitical area, the organization-specific encryption key;

receiving, from the second data store, the encrypted message; and responsive to receiving the encrypted message from the second data store, retrieving, from the key server, the organization-specific decryption key.

10. The method of claim 9, wherein the third geopolitical area is distinct from the first geopolitical area and the second geopolitical area.

11. The method of claim 9, further comprising:

storing, by the group-based communication system server, the organization-specific encryption key in a key cache located in the first geopolitical area.

12. The method of claim 9, wherein retrieving, from the key server, the organization-specific decryption key includes a substep of sending a request for the organization-specific decryption key to a look-through key cache in the first geopolitical area.

13. The method of claim 8, wherein the organization-specific encryption key is the same as the organization-specific decryption key.

14. The method of claim 8, further comprising logging the storing of the message to the second data store.

15. One or more non-transitory computer-readable media storing computer-executable instructions that, when executed by one or more processors, cause the one or more processors to perform operations for providing encryption key management for international data residency, the operations comprising:

receiving, by a group-based communication system server and from a first client device of a first user associated with an organization, a message to be posted to a group of a group-based communication system, wherein the group-based communication system server is located in a first geopolitical area;

encrypting, as an encrypted message, the message using an organization-specific encryption key;

responsive to determining, by the group-based communication system server and based on the organization, that data associated with the organization should be stored in a second geopolitical area distinct from the first geopolitical area, storing the encrypted message in a second data store located in the second geopolitical area;

storing information indicative of a storage location for the encrypted message in a first data store located in the first geopolitical area;

receiving, by the group-based communication system server and from a second client device of a second user associated with the organization, an indication of an attempt to access the message;

retrieving, by the group-based communication system server and from the first data store, the information indicative of the storage location for the encrypted message;

retrieving, by the group-based communication system server, the encrypted message from the second data store using the information indicative of the storage location for the encrypted message;

decrypting, as a decrypted message and by the group-based communication system server, the message using an organization-specific decryption key; and transmitting, by the group-based communication system server and to the second client device of the second user, the decrypted message.

16. The one or more non-transitory computer-readable media of claim 15, the operations further comprising:

receiving, from the first client device of the first user, the message to be posted to the group;

responsive to receiving the message to be posted to the group, retrieving, by the group-based communication system server and from a key server located in a third geopolitical area, the organization-specific encryption key;

receiving, from the second data store, the encrypted message;

responsive to receiving the encrypted message from the second data store, retrieving, from the key server, the organization-specific decryption key.

17. The one or more non-transitory computer-readable media of claim 16, wherein the third geopolitical area is the same as the second geopolitical area.

18. The one or more non-transitory computer-readable media of claim 16, the operations further comprising:

storing, by the group-based communication system server, the organization-specific encryption key in a key cache located in the first geopolitical area.

19. The one or more non-transitory computer-readable media of claim 16, wherein the indication of the attempt to access the message comprises scrolling, by the second user, to view a conversation history of the group.

20. The one or more non-transitory computer-readable media of claim 16, where transmitting, to the second client device of the second user, the decrypted message comprises transmitting, to the second client device of the second user, the decrypted message using transport-layer encryption.

* * * * *